United States Patent [19]

Greve et al.

[11] Patent Number: 5,095,476
[45] Date of Patent: Mar. 10, 1992

[54] SCANNING APPARATUS WITH INTEGRATED BEAM SEPARATING AND BEAM-SPLITTING ELEMENT FOR SCANNING A MAGNETO-OPTICAL RECORD CARRIER

[75] Inventors: Peter F. Greve; Albert Smid, both of Eindhoven, Netherlands

[73] Assignee: U.S. Philips Corporation, New York, N.Y.

[21] Appl. No.: 657,333

[22] Filed: Feb. 13, 1991

Related U.S. Application Data

[63] Continuation of Ser. No. 235,252, Aug. 22, 1988, abandoned.

[30] Foreign Application Priority Data

Apr. 26, 1988 [NL] Netherlands .......................... 8801075

[51] Int. Cl.$^5$ ................................................ G11B 7/00
[52] U.S. Cl. ....................................... 369/110; 369/112
[58] Field of Search .................... 369/13, 14, 54, 58, 369/110, 112, 44.11, 44.12

[56] References Cited

U.S. PATENT DOCUMENTS

| | | | |
|---|---|---|---|
| 4,358,200 | 11/1982 | Heemskerk et al. | 369/45 X |
| 4,544,269 | 10/1985 | Nose et al. | 350/162.17 |
| 4,753,513 | 6/1988 | Skikama | 369/46 X |
| 4,771,411 | 9/1988 | Greve | 369/112 X |
| 4,866,694 | 9/1989 | Korth | 369/44.11 |
| 4,894,815 | 1/1990 | Tamanaka | 369/112 |

FOREIGN PATENT DOCUMENTS

| | | | |
|---|---|---|---|
| 59-186149 | 10/1984 | Japan | 369/112 |
| 62-1131 | 1/1987 | Japan | 369/44.12 |
| 62-1141 | 1/1987 | Japan | 369/44.12 |
| 62-117150 | 5/1987 | Japan | 369/44.12 |

Primary Examiner—Donald McElheny, Jr.
Attorney, Agent, or Firm—Leroy Eason

[57] ABSTRACT

Scanning apparatus for a magneto-optical record carrier includes an integrated beam separating and beam splitting element consisting of a supporting body (30) on the surfaces of which are a semi-transparent mirror (22) and a polarization-sensitive beam-splitting layer (26). The semi-transparent mirror separates the scanning beam from the beam reflected from the record carrier. The beam-splitting layer splits the reflected beam into orthogonally polarized sub-beams (27 and 28) which are incident on respective photodiodes or on different regions of a single multiple photodiode. The supporting body may be of a birefringent material which provides orthogonally polarized beam-splitting, in which case the beam splitting layer may be omitted.

9 Claims, 7 Drawing Sheets

SCANNING APPARATUS WITH INTEGRATED BEAM SEPARATING AND BEAM-SPLITTING ELEMENT FOR SCANNING A MAGNETO-OPTICAL RECORD CARRIER

This is a continuation of application Ser. No. 07/235,252, filed Aug. 22, 1988, now abandoned.

The invention relates to an arrangement for optically scanning a radiation-reflecting information plane of a magneto-optical record carrier, the arrangement includes a radiation source unit for supplying a linearly polarized scanning beam, an objective system for focusing the scanning beam to a scanning spot in the information plane, a beam-separating element arranged in the radiation path between the radiation source unit and the scanning spot for separating the scanning beam originating from the radiation source unit and the radiation beam reflected in the information plane, a splitter for dividing the reflected radiation beam into two sub-beams, and a radiation-sensitive detection system for converting the sub-beams into electric signals.

An arrangement of this general type is described in European patent document EP-A 0,244,827 which corresponds to U.S. Pat. No. 4,731,772. The arrangement known from these documents comprises a beam-separating element in the form of a diffraction grating which is arranged in the radiation path of the scanning beam. The grating splits both the projected scanning beam and the beam reflected in the information plane into a number of diffraction orders. Only the $0^{th}$ diffraction order of the scanning beam is used for the scanning spot and the $+1^{th}$ and $-1^{th}$ orders are used for the detection of the reflected radiation. These $+1^{th}$ and $-1^{th}$ orders of the reflected beam are incident on two multiple photodiodes which supply electric signals to determine the position of the scanning spot in the information plane, the so-called servo-information, and to detect the magnetization of the magneto-optical record carrier at the area of the scanning spot. The state of magnetization can be recognized by a polarization rotation of at most 0.35° to the left or to the right. To be able to detect this small difference of 0.7° (peak-peak) in the direction of polarization, a polarization filter is arranged in each of the radiation paths of the two sub-beams between the diffraction grating and the photodiodes. The directions of polarization of the two filters are perpendicular with respect to each other and extend at an angle of 45° with respect to the average polarization direction of the beam reflected in the information plane. The polarization direction of the beam reflected in the information plane is detected as a difference in intensity between the two sub-beams.

The known arrangement has the drawback that the diffraction grating and the polarization filters which are individually mounted must be accurately aligned with respect to each other and with respect to the scanning beam. Certainly when the diffraction grating has curved grating lines and/or a variable grating period with which corrections are applied to the radiation beams, an extremely accurate alignment is required. Furthermore, the known arrangement comprises a large number of components which must be assembled during manufacture. In addition to these components lens is required to image the scanning beam with a minimum cross-section between the two radiation-sensitive detectors. Another drawback is that a considerable loss of radiation occurs in the polarization filters. Finally, maintaining mutual positions of the components during the lifetime of the scanning apparatus is a problem.

SUMMARY OF THE INVENTION

It is an object of the invention to provide an arrangement for scanning a magneto-optical record carrier comprising fewer individual components to be assembled, wherein the mutual positions of the components remain constant even for several years, which apparatus can be manufactured in large number at low cost.

To this end the arrangement according to the invention is characterized in that the beam-separating element comprises a transparent supporting body having a first and a second surface which are substantially parallel to each other and whose normals extend at an acute angle to the main rays, or principal axis of the incident radiation beams, a semi-transparent mirror being arranged on the first surface for separating the scanning beam and the reflected radiation beam, the beam-separating element being further adapted to split the reflected beam into two orthogonally polarized sub-beams. The polarization of the sub-beams is thus integrated with the beam-separating element so that only one component needs to be physically arranged during assembly of the arrangement. Furthermore, the semi-transparent mirror covers a certain surface within which the layer has a uniform composition so that accurate centration is not required, wherein the alignment tolerances may be much less strict than in the known arrangement.

Such a composite beam-separating element may be manufactured in large numbers at relatively low cost by starting from a large plate of the supporting body material, by providing the reflective material in strips on this plate and by subsequently cutting the plate into portions each constituting a beam-separating element.

The beam-separating element may comprise a plane-parallel plate of, for example, glass, but it may also comprise a wedge so that the two surfaces extend at an acute angle to each other. In the latter case a certain extent of astigmatism may be introduced or corrected in the scanning beam or the reflected beam.

It is to be noted that it is known per se from European patent document EP-A- 0,241,372 to manufacture a beam-separating element in an arrangement for scanning an optically readable disc in which the separation of the scanning beam and the beam reflected in the information plane and the separation of the reflected beam into two linearly polarized sub-beams in integrated in a single element. However, the known arrangement is not suitable for reading a magneto-optical record carrier. The two sub-beams are polarized in the same direction so that a polarization rotation due to a magnetic orientation in the information plane is not detectable as a difference in the radiation intensity on the two detectors.

An illustrative embodiment of the arrangement according to the invention is characterized in that a reflecting layer which is sensitive to the polarization direction is provided on one of the surfaces of the beam-separating element for splitting the reflected beam into two orthogonally polarized sub-beams. The polarization-sensitive reflecting layer may be provided on the first or on the second surface. The use of such a layer has the advantage that there is no loss of light due to additional polarization filters. Since the surface on which the layer extends may be larger than the diameter of the radiation beam and since the layer has a uniform composition throughout, the alignment tolerances of the polarization-sensitive reflecting layer may be very wide. Such a layer may alternatively be provided in strips on a large plate before cutting the plate into separate beam-separating elements.

This embodiment of the arrangement according to the invention is further characterized in that the radiation-sensitive detection system comprises two sub-systems for detecting the two orthogonally polarized sub-beams and in that the two sub-systems are arranged on the same side of the supporting body.

After reflection on the surface of one of the sub-beams located opposite the polarization-sensitive reflecting layer, the two sub-beams emerge substantially parallel to each other from the beam-separating element so that the radiation-sensitive detectors for the two sub-beams can be arranged in each other's vicinity.

A further illustrative embodiment of the arrangement according to the invention is characterized in that the supporting body comprises a birefringent material. By incorporating in the beam-separating element a birefringent material, for example quartz whose optic axis is suitably oriented, the reflected beam can be split into the two orthogonally polarized sub-beams without it being necessary to provide a separate polarization-sensitive beam-splitting layer. Moreover, this embodiment has the advantage that the intensity of the sub-beams, or of the electric signals derived therefrom can be adjusted in a simple way by a rotation of the beam-separating element around an axis perpendicular to the surface of the element.

The arrangement according to the invention is further characterized in that at least one prism is arranged on a surface of the transparent supporting body.

A reflecting layer which is sensitive to the polarization direction can be realized more easily if the layer is enclosed between two plates of a transparent material. The reflecting layer may thus be provided between the prism and the supporting body. Furthermore, a prism arranged on a surface of the supporting body in the radiation path of the radiation beam reduces refraction and reflections on this surface. Finally, a correction in the direction of the beam can be obtained if the exit face of the prism is not arranged perpendicularly to the main ray of a radiation beam.

A preferred illustrative embodiment of the arrangement according to the invention in which the radiation-sensitive detection system comprises a multiple photodiode is characterized in that the two sub-beams are incident on different areas of the multiple photodiode. During assembly of the arrangement it is therefore sufficient to arrange and connect only one, though multiple photodiode.

Since the beam-separating element can be arranged with fairly wide tolerances with respect to the radiation source unit and the radiation-sensitive detection system, these three components can be fixedly connected to form a rigid and robust assembly. A possibly required alignment of the optical light path can then be effected by means of an aligning element, for example, a plane-parallel plate or a wedge in the scanning beam or in the reflected beam. A preferred embodiment of the arrangement according to the invention is therefore characterized in that the radiation source unit and the radiation-sensitive detection system are fixedly connected to the supporting body and in that an optical element for aligning the scanning beam is arranged in the radiation path between the radiation source and the beam-separating element.

However, another illustrative embodiment of the arrangement according to the invention is characterized in that the radiation source unit and the radiation-sensitive detection system are fixedly connected to the supporting body and in that an optical element for aligning the sub-beam is arranged in the radiation path of a sub-beam between the beam-separating element and the radiation-sensitive detection system.

BRIEF DESCRIPTION OF THE DRAWING

The invention will now be described in greater detail, by way of example, with reference to the accompanying drawings in which.

DETAILED DESCRIPTION OF PREFERRED EMBODIMENTS

Figure 1:
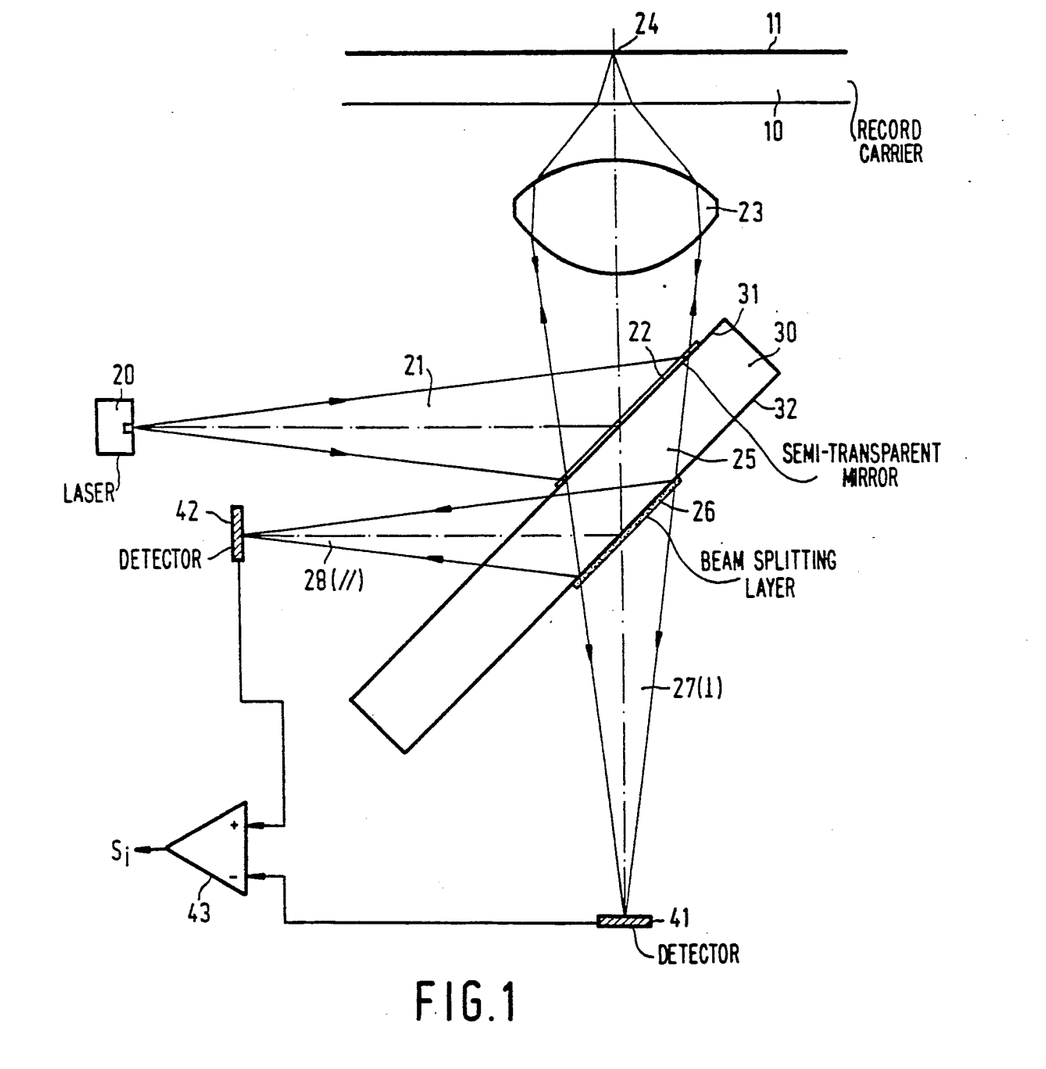
FIGS. 1, 2, 3 and 4 show diagrammatically four examples on which the various components (radiation source, detectors, etc.) may be arranged.

FIG. 1 shows diagrammatically a first example of the scanning arrangement according to the invention. Since in this Figure and in FIGS. 2, 3 and 4 the mutual positions of the components are shown diagrammatically only, refraction at the beam-separating element is not shown. In FIG. 1 the reference numeral 10 denotes a magneto-optical record carrier on which a magnetizable layer 11 is provided. Information is written in the layer 11 by polarizing juxtaposed areas in two opposite directions perpendicular to the plane of the layer. The areas are arranged in a track. In the case of a disc-shaped record carrier the track has a spiral form or its consists of a number of concentric circular sub-tracks. The information is stored in the tracks in the form of length differences of the areas of opposite magnetization.

The information is read by scanning the magnetized areas with a linearly polarized radiation beam. The polarization direction of the reflected radiation is rotated through a small angle with respect to that of the incident beam. The direction of rotation is determined by the direction of magnetization of the scanned area. In the present-day magneto-optical record carriers the difference of the polarization direction for radiation reflected into areas magnetized in different directions is approximately 0.7°. In the scanning arrangement the polarization direction of the reflected beam is measured by splitting this beam into two sub-beams and by subsequently measuring in each sub-beam the intensity of a component thereof in a polarization direction extending at an angle of 45° to the average polarization direction of the reflected beam, such measured components of the two sub-beams being mutually perpendicular between. The intensity difference in the two detected signals then indicates the direction of magnetization in the magnetized layer of the record carrier and hence the information to be read.

The arrangement shown in FIG. 1 comprises a radiation source unit 20, for example a laser diode generating a linearly polarized radiation beam 21. The beam 21 is reflected via a semi-transparent mirror 22 in the direction of the record carrier 10 and traverses an objective system 23 which focuses the beam to a scanning spot 24 in the magnetic layer 11 of the magneto-optical record carrier 10. The mirror 22 may be a conventional semi-transparent mirror, but alternatively the mirror 22 may have an increased reflection coefficient for one special polarization direction.

The semi-transparent mirror 22 is arranged on the surface 31 of the transparent supporting body 30, which surface 31 faces the record carrier 10. The surface 31 extends at an angle of approximately 45° to the main ray of the incident beam 21 and to the optical axis of the objective system 23.

A part 25 of the beam reflected in the radiation spot 24 passes through the semi-transparent mirror 22 and is incident on a polarization-sensitive beam-splitting layer 26 which is provided on the surface 32 of the supporting body 30 remote from the information carrier. The beam splitter 26 splits the incident beam 25 into two sub-beams 27 and 28 having a mutually perpendicular polarization direction. In this Figure this is indicated by means of the symbols ⊥ and ∥. The polarization directions of the two sub-beams extend at an angle of 45° to the polarization direction of the beam 25 coming from the scanning spot 24.

The two sub-beams 27 and 28 are incident on two radiation-sensitive detection systems 41 and 42, respectively. The detection systems convert the optical signals into electric signals which are applied to the inputs of a differential amplifier 43. The output signal of the differential amplifier 43 is the information signal $S_i$ and corresponds to the magnetization of the magnetized areas in the magnetizable layer 11 of the record carrier.

Figure 2:
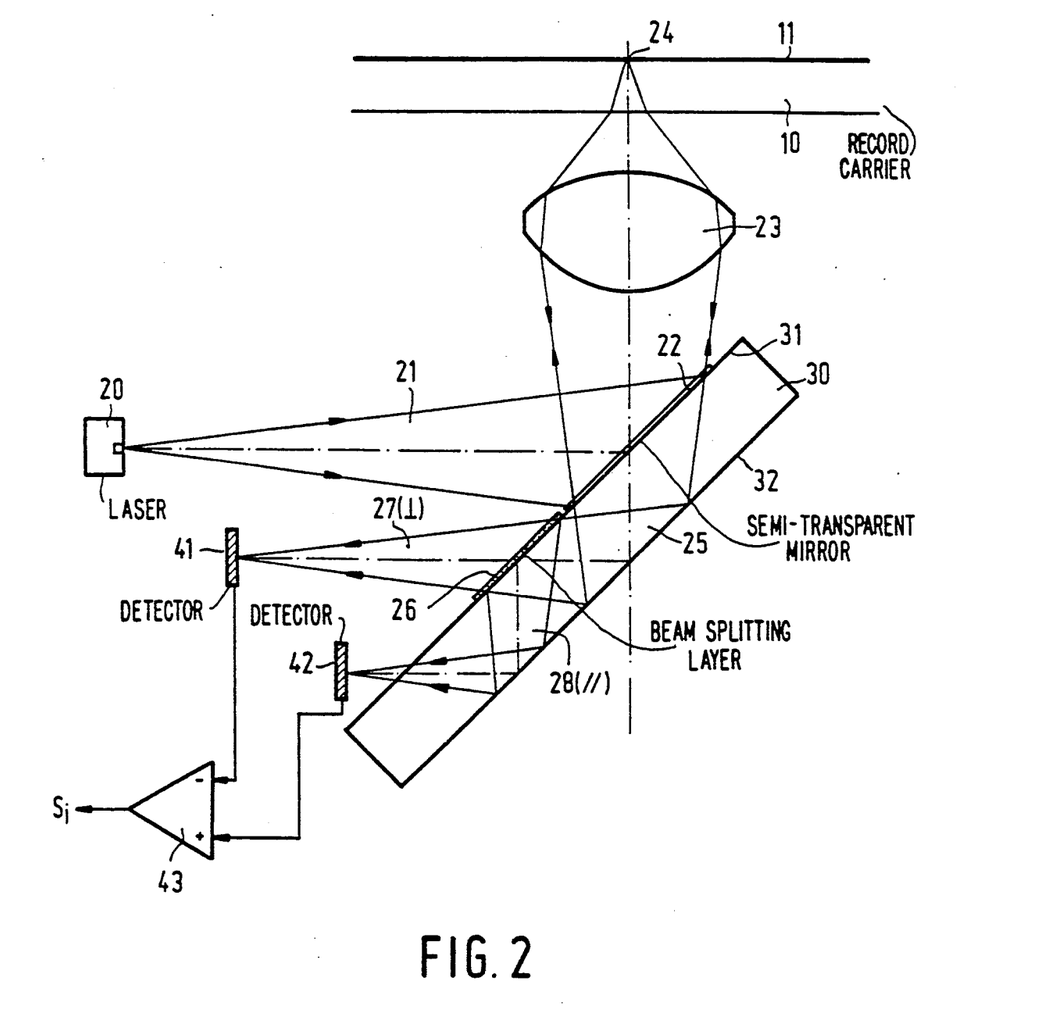

FIG. 2 shows an example of a different structure of the radiation path. Comparable components are denoted by the same reference numerals as in FIG. 1 and are not further described. In FIG. 2 the beam-splitting layer 26 which is sensitive to the polarization direction is provided on the same surface 31 of the supporting body 30 as the semi-transparent mirror 22. The radiation beam 25 coming from the scanning spot is reflected on the surface 32 of the supporting body 30 after it has traversed the semi-transparent mirror 22. The beam splitter 26 again splits the beam 25 into two sub-beams 27 and 28 having a mutual perpendicular polarization direction. The beam 27 is then directly incident on the radiation-sensitive detector 41. The beam 28 is reflected on the surface 32 and is incident on the radiation-sensitive detector 42 which is arranged on the same side of the body 30 sensitive detector 42 which is arranged on the same side of the body 30 as the radiation source unit 20 and the first detector 41. The output signals of the detectors 41 and 42 are subtracted from each other in the differential amplifier 43 whose output supplies the information signal $S_i$.

Figure 3:
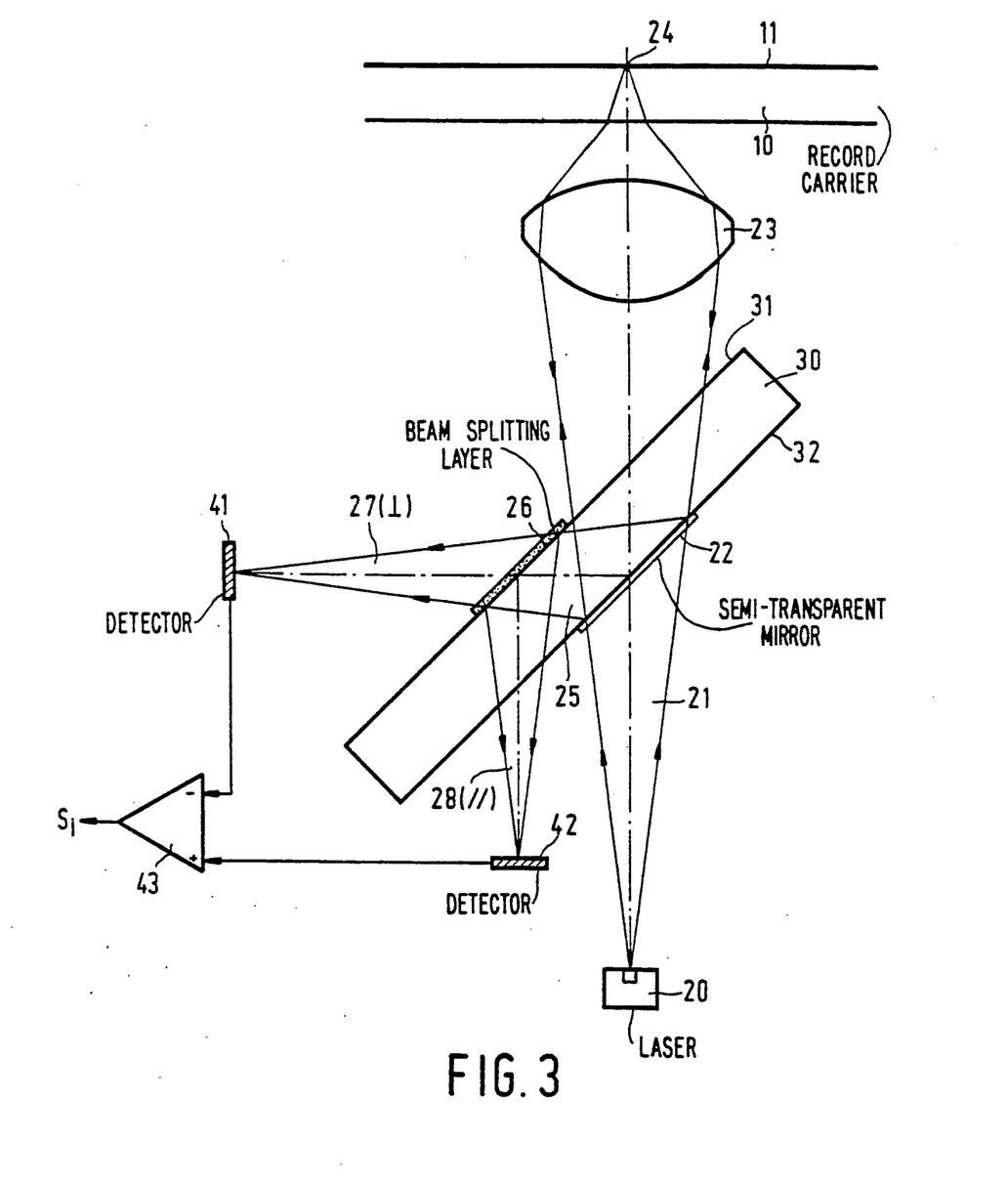
Figure 4:
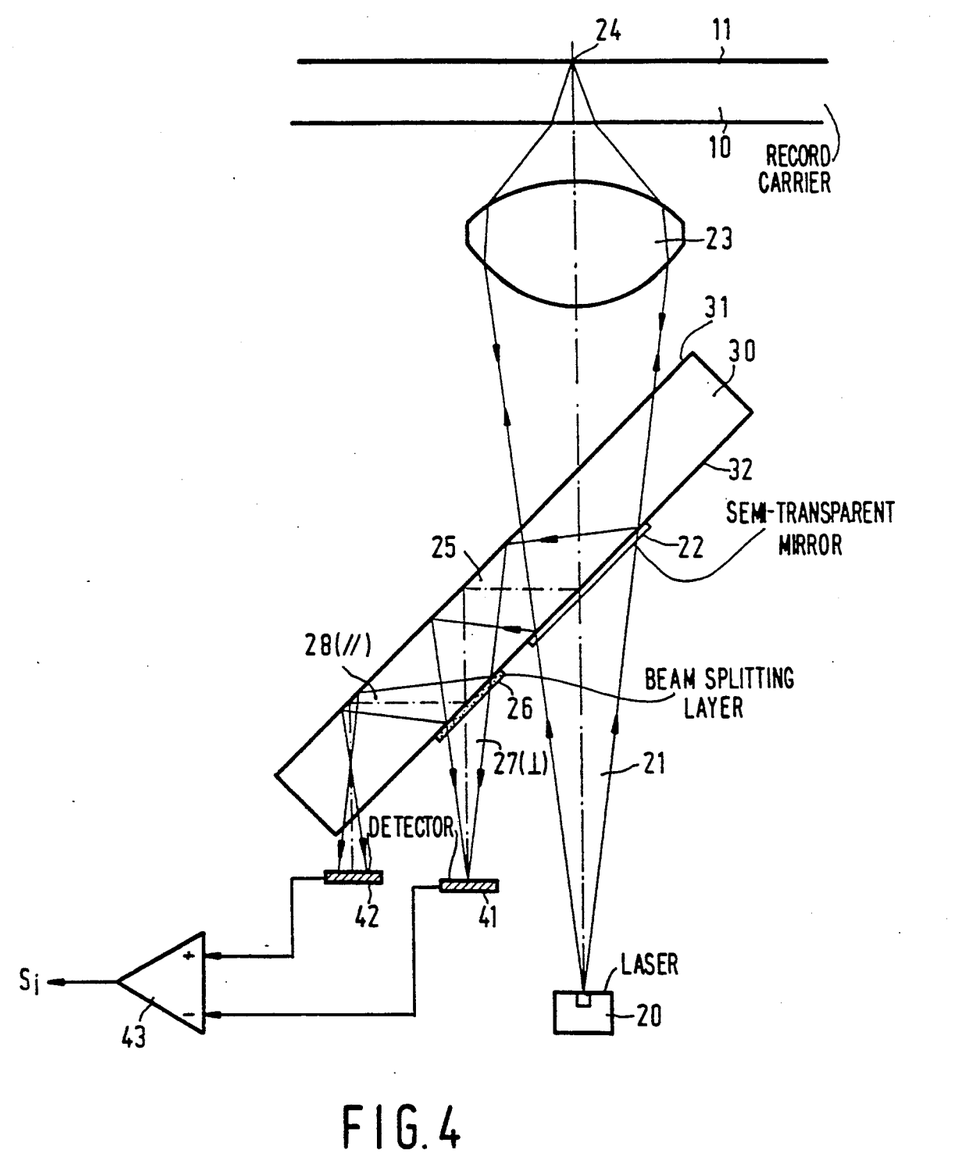

FIGS. 3 and 4 show two further examples of radiation paths according to the invention. In these two Figures comparable elements are denoted by the same reference symbols as in the two previous Figures. In the two Figures the radiation source unit 20 is arranged on the side of the transparent supporting body 30 opposite from the record carrier 10. The semi-transparent mirror 22 is arranged on the surface 32 of the body 30 remote from the record carrier. In FIG. 3 the polarization-sensitive beam-splitting layer 26 is provided on the surface 31 of the transparent supporting body 30 facing the record carrier 10. In FIG. 4 the polarization-sensitive beam-splitting layer is provided on the surface 32 remote from the record carrier. Furthermore, the detectors 41 and 42 in the example of FIG. 3 are arranged on either side of the body 30, and in the example of FIG. 4 both detectors are arranged on the same side as the radiation source unit 20. Since the scanning beam 21 in the configuration of FIGS. 3 and 4 passes the semi-transparent mirror 22 in transmission, this configuration is less sensitive to surface errors in the mirror 22 than in the examples according to FIGS. 1 and 2.

Figure 5:
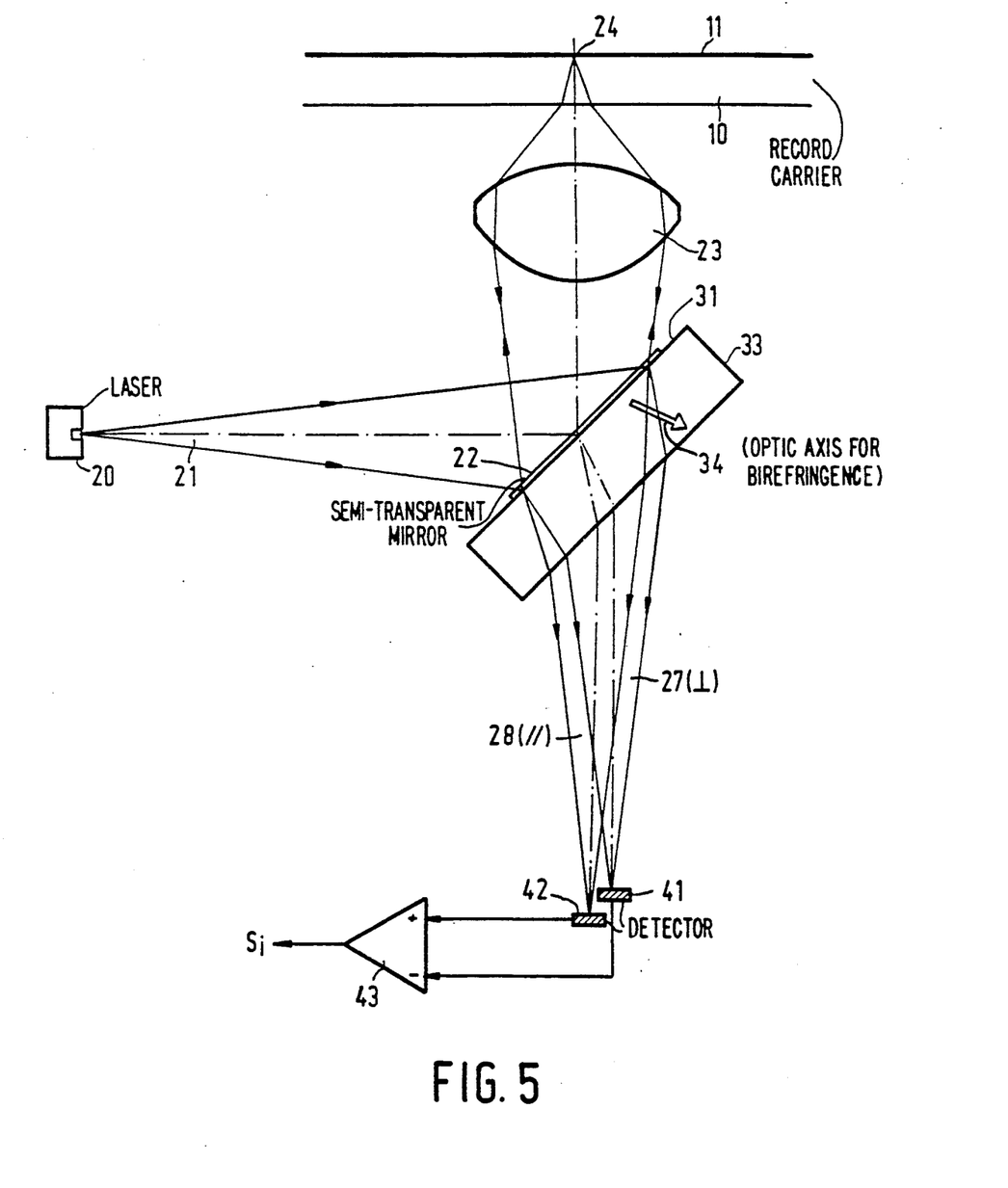
FIG. 5 shows diagrammatically a scanning arrangement in which the reflected beam is split into two orthogonally polarized sub-beams by means of a birefringent material.

FIG. 5 shows an alternative embodiment of the scanning apparatus according to the invention. Also in this Figure comparable elements are denoted by the same reference numerals as in the previous Figures.

In this embodiment of the scanning apparatus according to the invention the transparent supporting body 33 comprises a birefringent material, for example quartz, Due to the birefringence of this material the beam coming from the scanning spot 24 is split into two sub-beams 27 and 28 having a mutually perpendicular polarization direction. The direction of the optical axis of the material, denoted by arrow 34 in the Figure, must be in a plane extending at an angle of 45° to the average polarization direction of the beam coming from the scanning spot, viewed within the supporting body. For a maximum spatial separation of the two sub-beams 27 and 28 at a given thickness of the body 33 the optic axis must extend at an angle of approximately 45° to the main ray of this beam. Dependent on the nature of the detectors used, a less than maximum spatial separation may suffice. Otherwise, this embodiment is comparable with the previous embodiments and is therefore not further described.

Figure 6:
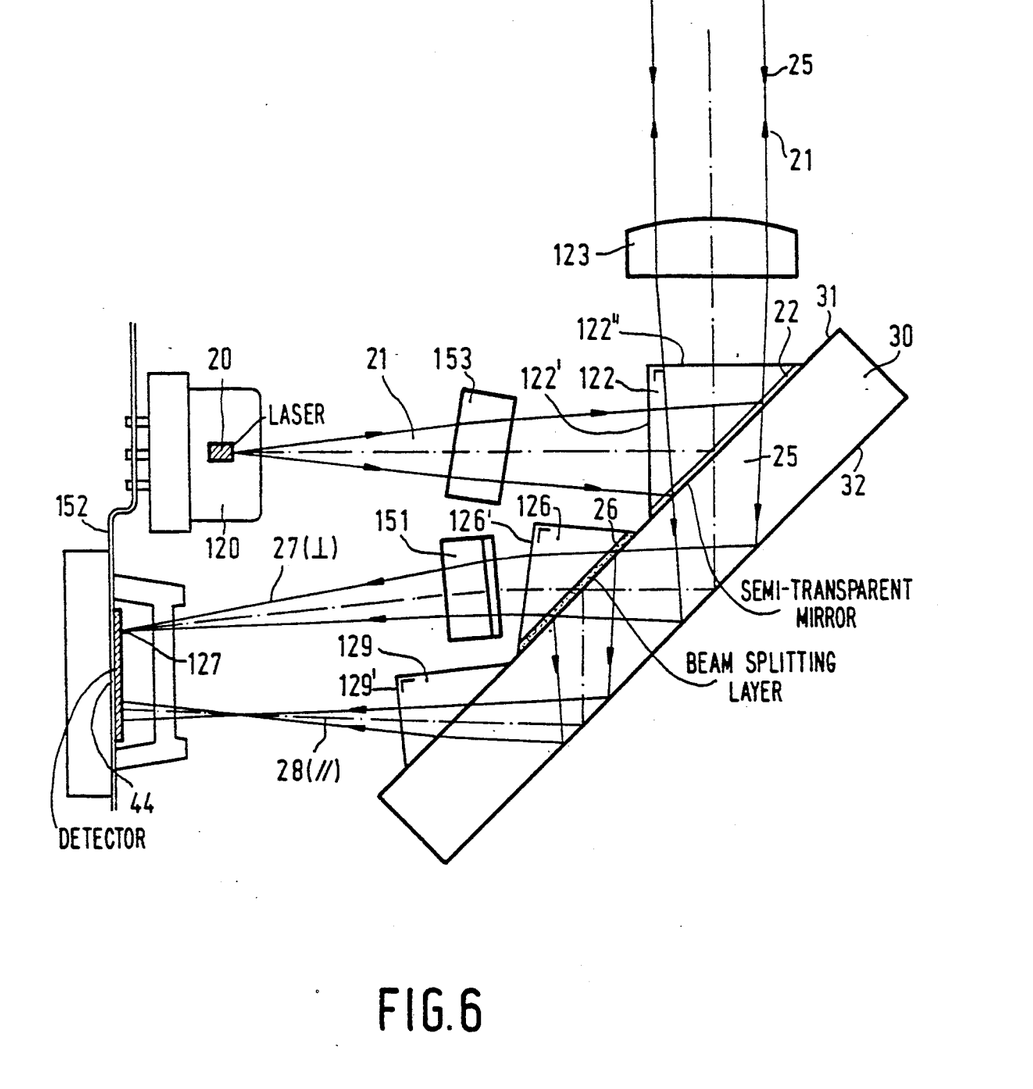
FIG. 6 shows a first practical embodiment of the arrangement according to the invention.

FIG. 6 shows a first embodiment of the scanning arrangement according to the invention. The radiation path in this embodiment is comparable with the radiation path shown in FIG. 2. A housing 120 accommodates a laser diode 20 which supplies a linearly polarized scanning beam 21. The beam 21 is reflected by the semi-transparent mirror 22 in the direction of the record carrier (not shown). A collimator lens 123 is arranged between the semi-transparent mirror 22 and the focusing objective not shown. The semi-transparent mirror is arranged on a surface 31 of the transparent supporting body 30. This mirror 22 may be arranged in a simpler and qualitatively better way if it is placed on the supporting body together with a prism 122. Moreover, the coupling-in and coupling-out prism 122 reduces or obviates unwanted reflection, refraction and distortion of the radiation beam on the surface 31. The entrance and exit faces 122' and 122" of the prism are perpendicular to the chief fay of the incoming and outgoing radiation beams 21 and 25. These faces are preferably provided with an anti-reflection coating.

The beam 25 from the record carrier passes through the semi-transparent mirror 22 and is reflected by the rear face 32 of the supporting body 30 in the direction o the beam-splitting layer 26 which is sensitive to the polarization direction. This layer is provided next to the semi-transparent mirror 22 on the surface 31 of the supporting body 30. The layer 26 splits the beam 25 into two sub-beams 27 and 28. The sub-beam 27 emerges directly from the supporting body 30 and the sub-beam 38 emerges after having been reflected on the rear face 32. The prism 126 is arranged over the polarization-sensitive beam-splitting layer 26. The sub-beam 28 emerges via the prism 129. Preferably, the exit faces 126' and 129° of the prisms are provided with an anti-reflection coating.

The beams 25 and 28 are reflected on the rear face 32 by due to total internal reflection or because a mirror coating is provided on the rear face in the case of a low refractive index of the material of which the supporting body 30 is made.

The two sub-beams 27 and 28 are incident on a composite photodiode 44. The prisms 126 and 129 are formed in such a way that the two sub-beams are incident on different portions of a multiple photodiode. The exit faces 12' and 129' are thus not perpendicular to the main rays of the sub-beams so that the beams are refracted when they pass through the exit faces.

The photodiode 44 is arranged in such a way that the sub-beam 27 is focused on the surface of the photodiode to a focusing spot 127. A cylindrical lens 151 is arranged in the radiation path of the sub-beam 27 coming from the record carrier. Therefore, the position of the scanning spot with respect to the tracks of magnetized areas on the record carrier can be derived from the shape and/or the size and the location of the focusing spot on photodiode 44. The photodiode should then be divided into sectors. This so-called astigmatic method of focusing is described inter alia in U.S. Pat. No. 4,023,033. In this method a round spot changes into an elliptical spot in the case of defocusing, whilst the direction of the major axis of the ellipse indicates the sign of the focusing error.

In a different focusing method a wedge is arranged at the location of the element 151, with which wedge a variation of the shape of the focusing spot 127 on the photodiode 44 is produced, dependent on the focusing of the scanning spot on the information plane of the record carrier. The cylindrical lens or wedge may alternatively be integrated with the prism 126 on the supporting body 30.

The housing 120 of the laser diode 20 and the photodiode 44 may be secured to a common support 152 and may be fixedly connected thereto with respect to each other. For aligning the scanning beam 21 with respect to the optical elements and the photodiode 44 a separate aligning element 153, for example a plane-parallel plate is provided which is arranged in the radiation path of the scanning beam 21 between the diode laser 20 and the supporting body 30. The optical system is adjusted by moving this element 153.

The radiation path can be alternatively aligned by giving the element 152 in the radiation path of the sub-beam 27 an optical power and by moving it transversely to the direction of the beam.

Figure 7:
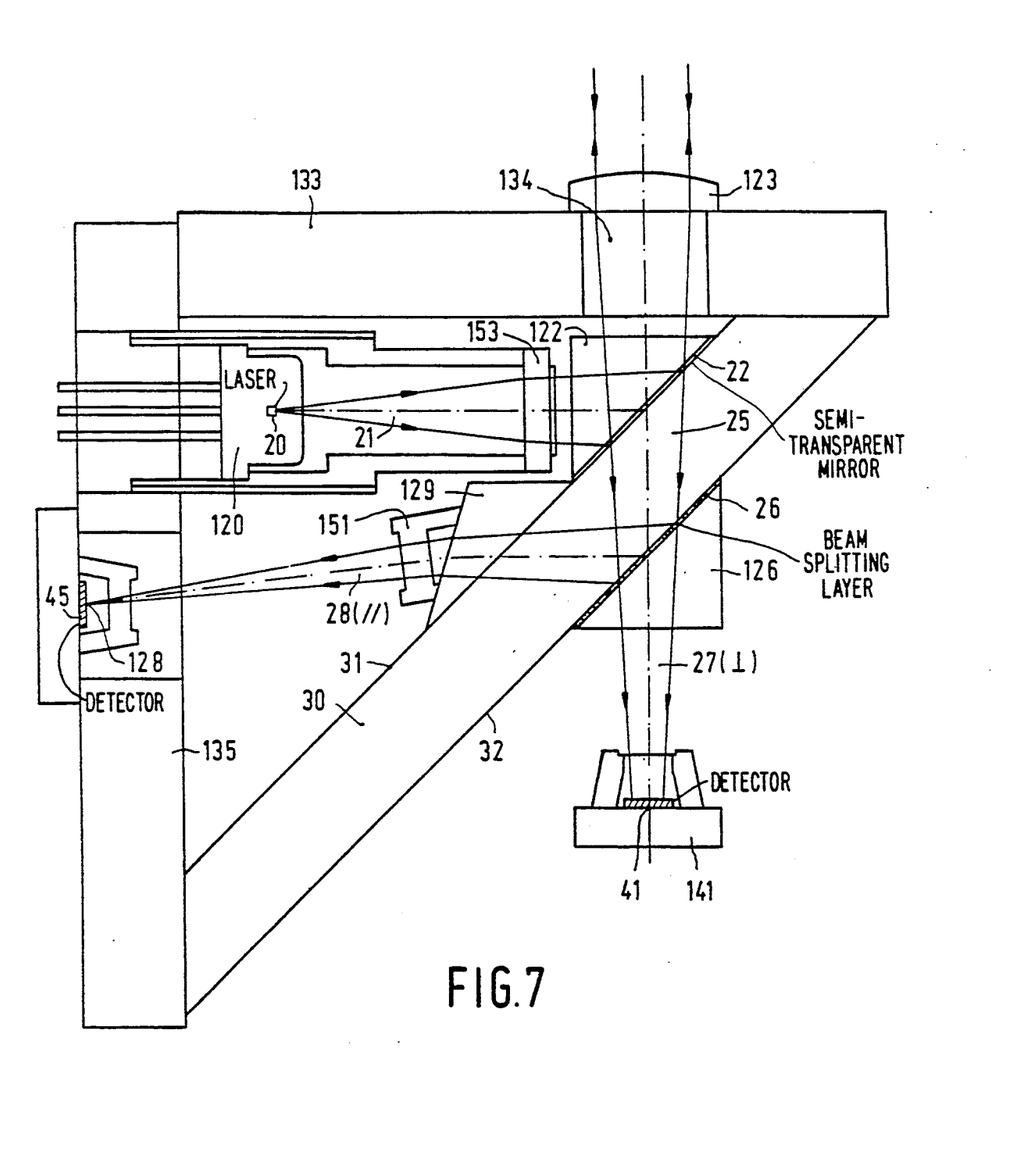
FIG. 7 shows a second embodiment of the arrangement according to the invention.

FIG. 7 shows a second embodiment of the scanning arrangement according to the invention. The radiation path of this reference to FIG. 1. A number of elements correspond to elements shown in FIG. 6. It is therefore not necessary to give a detailed description of all elements.

The transparent supporting body 30 is secured between two plates 133 and 135 which are connected perpendicularly to each other and are made of the same material or of a material having the same mechanical properties as the body 30. The beams 21 (projected beam) and 25 (reflected beam) transverse the plate 133 via an aperture 134 in the plate 133. The beam 25 coming from the record carrier (not shown) is split into two orthogonally polarized sub-beams 27 and 28 in the beam-splitting layer 26, which is sensitive to the polarization direction. The sub-beam 27 is detected by the photodiode 41 which is arranged on a support 141. The sub-beam 28 is focused on the multiple photodiode 45. The element 151 and the prism 129 are arranged in the radiation path of the sub-beam 28 in order to cause a distortion of the focusing spot 128 on photodiode 45 dependent on the focusing error of the scanning spot on the record carrier. The photodiode 45 thus not only contributes to deriving the information signal but also supplies servo-signals for focusing the scanning spot on the track in which the magnetic areas are arranged on the record carrier.

The structure of this scanning arrangement is eminently suitable for being produced in large number. Larger portions of the plates 30, 133 and 135 can be glued together. The plate 30 may already be provided with a semi-transparent mirror coating 22, a polarization-sensitive layer 26 and prisms 122, 126 and 129. After the glue has cured, a number of structures can be cut from the larger portions which structures need only be provided with laser and photodiodes and lenses.

Such a support structure is not limited to an arrangement for scanning a magneto-optical record carrier. In the absence of the polarization-sensitive beam-splitting layer total reflection will occur on the face 32 so that the scanning apparatus is suitable for use in other optical information storage systems such as are known under the names of "Compact Disc" and Laservision".

What is claimed is:

1. Apparatus for scanning a radiation-reflecting information plane of a magneto-optical record carrier, said apparatus comprising a radiation source for providing a linearly polarized scanning beam, an objective system for focusing the scanning beam to form a scanning spot in the information plane which produces a reflected beam of radiation therefrom, the reflected beam sharing a portion of the radiation path traversed by said scanning beam between the radiation source and the scanning spot, means arranged in said portion of said radiation path for separating the scanning beam from the reflected beam, and a radiation-sensitive detection system for converting the reflected beam into electrical signals; characterized in that:

the beam-separating means is included in a single integrated optical element comprising:

a transparent supporting body having first and second substantially parallel planar surfaces, said supporting body being disposed in said portion of said radiation path so that a normal to said surfaces thereof extends at an acute angle to a principal axis of the reflected beam incident thereon;

a semi-transparent mirror on a portion of said first surface for separating the scanning beam and the reflected radiation beam, said mirror thereby constituting said beam-separating means; and means for splitting the separated reflected beam by partial transmission and partial reflection or by bi-refringence into two sub-beams which are orthogonally polarized with respect to each other;

and further characterized in that the radiation detection system comprises means responsive to said two sub-beams to produce two electric signals respectively corresponding thereto, and means for producing an output electric signal corresponding to the difference between said two signals; said output electric signal being indicative of a direction of polarization rotation of the reflected beam and thereby also being indicative of a magnetization direction of said information plane in the region of said scanning spot.

2. Apparatus as claimed in claim 1, wherein said beam-splitting means is a polarization sensitive partially reflecting layer on said first surface of said supporting body.

3. Apparatus as claimed in claim 1, wherein said beam-splitting means is a polarization sensitive partially reflecting layer on said second surface of said supporting body.

4. Apparatus as claimed in claim 1, wherein the radiation-sensitive detection system comprises two photo-detectors for respectively detecting the two orthogonally polarized sub-beams, both photo-detectors being located on the same side of said supporting body.

5. Apparatus as claimed in claim 1, wherein the supporting body comprises a birefringent material which constitutes said beam-splitting means.

6. Apparatus as claimed in claim 2, further comprising at least one prism which is arranged on one of said semi-transparent mirror, said beam-splitting layer, or a portion of the surface of the transparent supporting body in the path of one of said sub-beams.

7. Apparatus as claimed in claim 3, further comprising at least one prism which is arranged on one of said semi-transparent mirror, said beam-splitting layer, or a portion of the surface of the transparent supporting body in the path of one of said sub-beams.

8. Apparatus as claimed in claim 1, wherein the radiation-sensitive detection system comprises a multiple photodiode, the two sub-beams being incident on different areas of said multiple photodiode.

9. Apparatus as claimed in claim 1, wherein the radiation source and the radiation-sensitive detection system are fixedly connected together and to the supporting body, and further comprising an optical element in the path of one of said sub-beams for aligning such sub-beam in a radiation path between the beam separating element and the radiation-sensitive detection system.

* * * * *